April 3, 1956  R. F. SWETT  2,740,428
DUCT CONSTRUCTION
Filed Nov. 17, 1952
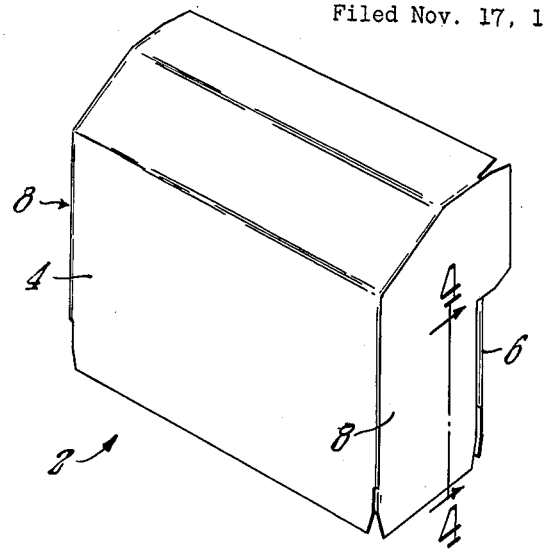
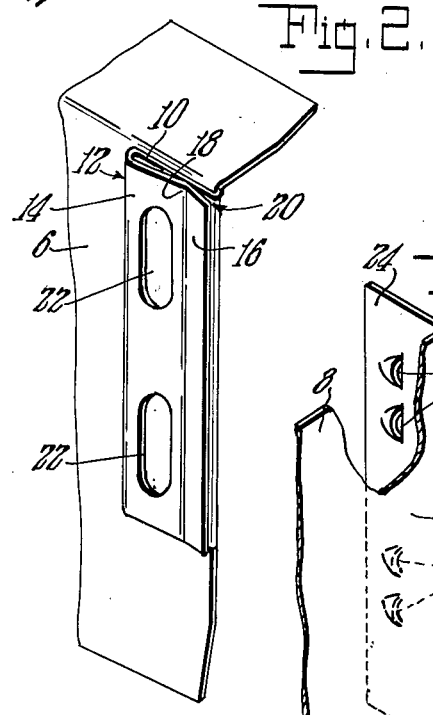
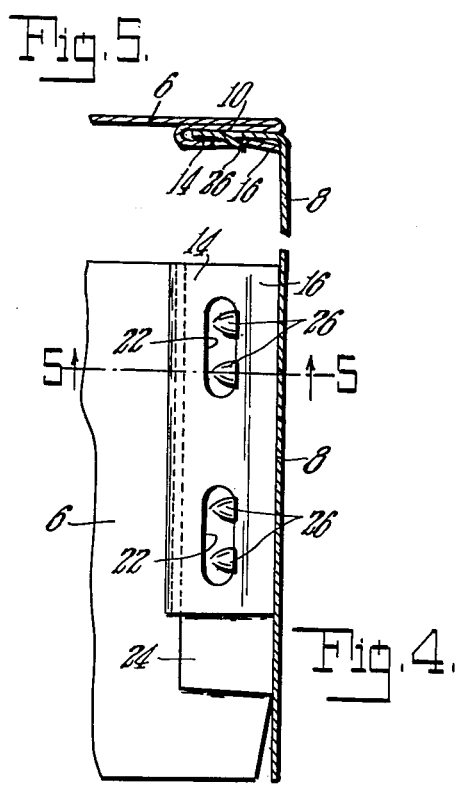
INVENTOR.
BY Russell F. Swett United States Patent Office 2,740,428
Patented Apr. 3, 1956

2,740,428

DUCT CONSTRUCTION

Russell F. Swett, Longmeadow, Mass., assignor to Swett Bros. Heating & Appliance Co., Springfield, Mass., a corporation of Massachusetts Application November 17, 1952, Serial No. 321,003

1 Claim. (Cl. 138—75)

This invention relates to improvements in duct construction and is directed more particularly to improvements in securing means for the elements of a knockdown duct section.

The principal objects of the invention are the provision of locking means for the components of a sheet metal duct section.

It is common practice in the construction of duct systems for ventilating, air conditioning and the like to supply the various sections such as elbows, T's, straight runs and the like in knock-down condition. That is, the components of a duct section such as an elbow, straight run are packaged in knock-down form. The components of the various sections are set up or assembled on the job and the sections are connected together to form the duct system.

Some difficulty in assembling the components of a duct section has been experienced; in many cases some tools are required and raw edges of the metal are exposed which is objectionable.

According to the novel features of this invention, locking means is provided for the components of a duct section which is constructed and arranged to facilitate the ready and easy assembling of the components without the aid of tools.

According to a special feature of the invention, the locking means is disposed within the duct section so that the connection between the components presents a pleasing and finished appearance and there are no raw edges of the metal visible.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a perspective view of a duct section in the form of an elbow embodying the novel features of the invention;

Fig. 2 is a sperspective view of an edge of one of the components of the duct section of Fig. 1;

Fig. 3 is a view similar to Fig. 2 showing an edge of another component of the duct section of Fig. 1;

Fig. 4 is an elevational sectional view on the line 4—4 of Fig. 1; and

Fig. 5 is a sectional plan view on the line 5—5 of Fig. 4.

Referring now to the drawings in detail, the invention will be fully described.

A duct section is shown at 2 in Fig. 1 which for purposes of disclosure is in the form of an enbow. It will be understood that the novel features of the invention is adapted for use in connection with sections of other forms such as a T, straight-away, and the like, so that section refers to any form of section composed of plural components.

The section 2 has a front wall 4, a rear wall 6 and end walls 8 which are formed from relatively thin sheet metal.

Adjacent edge portions of adjacent components are formed for interlocking engagement and for purposes of disclosure, the edge portions of an end wall 8 and rear wall 6 will be described.

An elongated edge portion 10 of the rear wall is turned inwardly to lie on the inner face of said wall and is then folded at 12 so that a portion 14 is disposed over the portion 10, see Fig. 2. This portion 14 may be called a lip portion.

Preferably the outer longitudinal edge 16 of the portion 14 flares outwardly away from the portion 10 and an intermediate portion 18 is closely adjacent the portion 10. In this way, an elongated entrance 20 is provided and the wall 6 being formed from sheet metal the lip portion is yieldable or resilient so that a flange of an adjacent component may be readily inserted in the entrance 20 and between portions 10 and 14 which form a slot with the lip portion yieldingly bearing on the flange.

Sockets 22 are provided in the lip 14 which in the preferred form of the invention are elongated slots.

A flange 24 provided on the end wall 8 is adapted for insertion in the entrance 20 and has locking keys 26 struck up therefrom on the inner side thereof.

As the flange 24 is inserted through the entrance 20 into the slot between portions 10 and 14, the keys force the portion 14 outwardly to some extent until said keys enter the sockets. In the sockets, the lip portion 14 springs inwardly so that the edge of the slot lies forwardly of the keys and prevents withdrawal of the flange from the slot.

Opposite edges of the front and rear walls may be formed with the slots and sockets and opposite edges of the end walls may be provided with flanges and keys for inserting into the slots and sockets.

In this way, the components are locked together and the components of any duct section may be likewise interlocked.

It will be observed that the interlocking elements are disposed within the duct so that there are no raw edges or unsightly parts on the outer sides of the section.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Connecting construction for edge portions of a separate pair of duct sections formed from yieldable sheet metal comprising, one of the duct sections having an elongated marginal edge portion bent on an elongated outer first line of bend over and inwardly onto the face of the section providing a lower channel wall and then being looped over and outwardly as an upper channel wall on an inner second line of bend spaced inwardly of the first line of bend providing an upper channel wall disposed over the lower wall and cooperating therewith to form a channel, the upper wall channel wall declining downwardly and outwardly from the inner second line of bend into contact with the lower channel wall along a third line of bend spaced inwardly of the first line of bend and then diverging as an outer longitudinal portion from the third line of bend upwardly relative to the lower wall to the longitudinal outer edge of the upper wall, the outer edge being disposed in substantial alignment with the first time of bend, the longitudinal portions of the lower and upper walls outwardly of the third line of bend providing an elongated converging mouth into the elongated channel formed by said lower and upper walls inwardly of the third line of bend, said first and second and third lines of bend being in parallelism, said upper wall inwardly of the third line of bend provided with longitudinally spaced slots between the inner second and third lines of bend having locking edges inwardly of and parallel to said third line of bend, the other of said sections having an elongated marginal edge portion insertable into and through the mouth and into the channel of said one section and provided with portions struck up therefrom having surfaces inclining upwardly relative to the upper face of said portion from points spaced inwardly of the outer longitudinal edge of said portion which are transversely curving to form elevated inner arcuate locking edges parallel to the edge of said portion to engage the locking edges of the slots thereof with said portion in the channel of said one member.

References Cited in the file of this patent

UNITED STATES PATENTS

| | | |
|---|---|---|
| 1,827,722 | Hayman | Oct. 13, 1931 |
| 1,829,754 | Miller | Nov. 3, 1931 |
| 2,201,409 | Siebenlist | May 21, 1940 |
| 2,242,468 | Holub | May 20, 1941 |
| 2,259,382 | Ingels | Oct. 14, 1941 |